(12) United States Patent
Nobbe

(10) Patent No.: US 12,202,778 B2
(45) Date of Patent: Jan. 21, 2025

(54) HOT-GAS-GENERATING APPARATUS WITH IONIC MONOPROPELLANT AND LOW VOLTAGE IGNITION

(71) Applicants: LABORBITAL GMBH, Moosinning (DE); Saverio Nobbe, Munich (DE)

(72) Inventor: Saverio Nobbe, Munich (DE)

(73) Assignees: Saverio Nobbe, Moosinning (DE); LABORBITAL GMBH, Moosinning (DE)

( * ) Notice: Subject to any disclaimer, the term of this patent is extended or adjusted under 35 U.S.C. 154(b) by 0 days.

(21) Appl. No.: 18/175,508

(22) Filed: Feb. 27, 2023

(65) Prior Publication Data

US 2023/0202942 A1 Jun. 29, 2023

Related U.S. Application Data

(63) Continuation-in-part of application No. PCT/EP2021/073394, filed on Aug. 24, 2021.

(30) Foreign Application Priority Data

Aug. 26, 2020 (DE) .......................... 102020122337.4

(51) Int. Cl.
*F02K 9/52* (2006.01)
*C06B 23/00* (2006.01)
(Continued)

(52) U.S. Cl.
CPC ............ *C06B 33/12* (2013.01); *C06B 23/002* (2013.01); *C06B 23/007* (2013.01); *C06B 25/34* (2013.01);
(Continued)

(58) Field of Classification Search
CPC ................................... F02K 9/52; F02K 9/425
See application file for complete search history.

(56) References Cited

U.S. PATENT DOCUMENTS

| 3,651,644 A | 3/1972 | Breen et al. |
| 3,861,137 A | 1/1975 | Russell et al. |

(Continued)

FOREIGN PATENT DOCUMENTS

WO 2012166046 A3 1/2013

OTHER PUBLICATIONS

International Preliminary Report on Patentability and Annexes dated Sep. 1, 2022 issued in PCT/EP2021/073394.
(Continued)

*Primary Examiner* — Lorne E Meade
(74) *Attorney, Agent, or Firm* — Kubota & Basol LLP

(57) ABSTRACT

A hot-gas-generating apparatus for reacting a propellant comprises a combustion chamber, at least one injector that is arranged upstream of the combustion chamber and can be closed, on the combustion chamber side, to the propellant, electrodes being integrated in said injector, and at least one supply line for the propellant. In this context, the propellant is a monopropellant and a substantially water-free ionic solution having low vapor pressure, preferably with a residual water content of less than five percent by mass, which is capable of self-sustaining combustion at a given combustion chamber pressure, and the electrodes have at least two electrodes of opposite polarity which are suitable for electrically igniting the propellant by means of a flow of current through the propellant when this propellant flows between the opposite-polarity electrodes.

19 Claims, 4 Drawing Sheets

(51) Int. Cl.
*C06B 25/34* (2006.01)
*C06B 33/12* (2006.01)
*F02K 9/42* (2006.01)
*F23R 3/28* (2006.01)

(52) U.S. Cl.
CPC ............... *F02K 9/425* (2013.01); *F02K 9/52* (2013.01); *F23R 3/28* (2013.01)

(56) References Cited

U.S. PATENT DOCUMENTS

| | | | | |
|---|---|---|---|---|
| 4,782,660 | A * | 11/1988 | Domyan | F02K 9/52 60/258 |
| 4,930,394 | A * | 6/1990 | Zwingel | F41B 6/00 89/7 |
| 5,014,918 | A * | 5/1991 | Halvorsen | B05B 7/065 239/410 |
| 5,605,287 | A * | 2/1997 | Mains | F23D 11/107 239/416.4 |
| 8,141,338 | B2 * | 3/2012 | Goislot | F02K 9/94 60/39.462 |
| 8,375,697 | B2 | 2/2013 | Valentian | |
| 8,596,039 | B2 * | 12/2013 | Goislot | F02K 9/52 60/39.461 |
| 2010/0005779 | A1 | 1/2010 | Goislot | |
| 2010/0107601 | A1 | 5/2010 | Valentian | |
| 2013/0305685 | A1 | 11/2013 | Pelletier | |
| 2015/0059314 | A1 | 3/2015 | McPherson | |
| 2015/0299063 | A1 | 10/2015 | Wai et al. | |

OTHER PUBLICATIONS

International Search Report dated Dec. 21, 2021 issued in PCT/EP2021/073394.
Negri et al., "New technologies for ammonium dinitramide based monopropellant thrusters—The project Rheform", Acta Astronautica, 2018, vol. 143, 105-117.
Written Opinion dated Dec. 21, 2021 issued in PCT/EP2021/073394.

* cited by examiner

A-A

HOT-GAS-GENERATING APPARATUS WITH IONIC MONOPROPELLANT AND LOW VOLTAGE IGNITION

CROSS REFERENCE TO RELATED APPLICATIONS

This This application is a 35 U.S.C. § 111 (a) continuation in-part of PCT Application PCT/EP2021/073394 having an International Filing Date of Aug. 24, 2021, which claims priority to German domestic application DE102020122337 Filed Aug. 26, 2020, the entire contents of which are incorporated herein by reference in its entirety for all purposes.

FIELD OF THE INVENTION

A hot-gas-generating apparatus is proposed which is optimized in particular for aerospace applications and allows both ignition and stable combustion of liquid ionic propellants. The propellants are essentially free of volatile solvents (e.g. water) and, thanks to their negligible vapor pressure, can be ignited even under vacuum conditions, understood to include pressures below ambient pressure for the present invention. Ignition is achieved by temporarily applying a low voltage to the electrodes located in the injector. The special design of the self-sealing injector prevents a flashback of the flame front upstream of the injection head.

BACKGROUND OF THE INVENTION

The invention comprises a hot-gas-generating apparatus with electric ignition of monergolic, ionic liquid propellants of low vapor pressure and a method for igniting the same. Hot-gas generators based on liquid monopropellants have been used since the early days of rocketry, where their typically low exhaust temperatures or relative simplicity are advantageous compared to bipropellant hot-gas generators. One of the earliest application examples is found in the operation of turbopumps for rocket engines, as well as turbine-based electric generators (APUs) and hydraulic power units. In the meantime, satellite technology has come to the fore as the main area of application, where monopropellant hot-gas generators provide the working medium for low- and medium-thrust satellite engines. The monopropellant used in this context is almost exclusively hydrazine, which is carcinogenic and highly sensitive towards contaminants. Satellite engines use packed bed reactors for gas generation, that rely on a catalytically active, e.g. iridium-coated, support material. Typically, an electromagnetically actuated valve initiates the thrust phase of the engine and liquid hydrazine is injected into the preheated reactor. Decomposition of the hydrazine then produces temperatures of up to 1300 K and yields nitrogen and hydrogen, beside some ammonia. Following a similar operating scheme, hydrogen peroxide has also been used in the past, but its storability is considered to be even more difficult. The high temperatures and temperature gradients, as well as byproducts (catalyst poisons), limit not only the service life of the catalyst, but also the cold-start capability. In current satellite engines, a decrease in catalytic conversion rate, and thus engine performance, occur during the operational lifetime. The packed bed reactors are also sensitive towards solid deposits, so that higher performing propellants, which might be metallized, soot-generating or oxygen-deficient and therefore more hardware-friendly, cannot be used.

As already mentioned in U.S. Pat. No. 3,651,644 to Breen, et al. ("Breen")—the entire contents of which are incorporated herein by reference for all purposes-, alternatives to catalytic decomposition were therefore investigated which targeted thermal decomposition by electrolytic heating of hydrazine in the gap between two fixed electrodes. The operability of the apparatus described is questionable, especially under vacuum conditions, since hydrazine will only be present as a gas phase of low electrical conductivity below its vapor pressure and provide only a limited amount of mobile ions even when liquid. Also, the high vapor pressure of hydrazine and other common monopropellants means that the decomposition temperature cannot be reached by methods that necessarily rely on the presence of a liquid phase. This is especially true for electrolytic, ohmic or radiative (cf. laser) heating and ignition.

Breen teaches the fixed electrode spacing and the permanent opening of the injector and electrolytic reaction chamber towards the combustion chamber pose a significant safety risk, since especially in the event of pressure fluctuations during operation or after a shutdown of the propellant supply, it is not possible to prevent the reaction from progressing upstream of the injector. The same problems can be identified in U.S. Pat. No. 3,861,137 to Russell et al. ("Russell")—the entire contents of which are incorporated herein by reference for all purposes—where electrolytic decomposition of an unspecified monopropellant in the fixed gap of two electrodes is also used for ignition. In contrast to Breen, Russell teaches both electrodes and the gap between them are made of porous, permeable materials. While the porosity and increased surface area promise faster ignition of the monopropellant and more stable combustion thanks to increased heat transfer, some of the problems of packed bed catalytic reactors are inherited because of the porosity. For example, the porous medium lacking thermal insulation from the combustion chamber, is affected by the high temperatures of the exhaust gas and, due to the large surface area, is particularly at risk from sintering, or clogging by soot-forming decomposition processes. The fine-pored electrodes also prohibit the use of metallized propellants.

A more recent invention outlined in U.S. Pat. No. 8,375,697 to Valentian ("Valentian")—the entire contents of which are incorporated herein by reference for all purposes-describes an electrolytic igniter for bipropellant rocket engines, wherein an electrically conductive solution is heated in the necessarily large gap between at least two electrodes for the purpose of ignition only and at least one of those electrodes is located downstream of the injector in the combustion chamber. The electrolytes used are either non-energetic ionic liquids and pure or near pure chemical substances, or aqueous monopropellants. In the first case, the low vapor pressure allows the electrolyte to be heated up to its decomposition temperature, which, however, is usually below 500° C. Since no further heating of the decomposition products can take place beyond this by means of an exothermic reaction, ignition of the added bipropellants is greatly complicated. Ignition by means of an aqueous monopropellant with non-negligible vapor pressure is not applicable for the reasons already mentioned above. Additionally, no measures are shown to prevent flashback of the flame front upstream of the electrolyte injector, in US Valentian as well. Since the electrolyte jet has to cross the injection zones of oxidizer and fuel, electrode distances in the range of several millimeters would be necessary. Under these conditions, not only is the uninterrupted buildup of a conductive heating path complicated by the intersecting jets of the bipropellants, but the application of high voltages is also required.

In addition to the two classic monopropellants hydrazine and hydrogen peroxide mentioned at the beginning, the focus of research moved to two "green" alternatives in recent years. On the one hand, hydroxylammonium nitrate—(HAN—) based liquid propellants and on the other hand, ammonium dinitramide—(ADN—) based liquid propellants, which are aqueous solutions and contain an organic fuel (e.g., methanol) beside the first-mentioned oxidizers. For example, in WO 2012/166046 to Thormaehlen et al. ("Thormaehlen")—the entire contents of which are incorporated herein by reference for all purposes—an ADN-based liquid propellant is described, which, however, is not suitable for storage under vacuum conditions or electric ignition due to its high vapor pressure. The latter is evidenced e.g. by results obtained during the RHEFORM project (Negri et al., "New technologies for ammonium dinitramide based monopropellant thrusters—The project RHEFORM", Acta Astronautica, 2018, vol. 143, 105-117)—the entire contents of which are incorporated herein by reference for all purposes—in which aqueous ADN propellants such as LMP-103S or FLP-106 were subjected to electric pulses up to about 350 volts DC.

In order to eliminate the above-mentioned disadvantages of previous electrolytic ignition concepts, the introduction of a new monopropellant of very low vapor pressure is as necessary, as a reconfiguration of the electrodes and the implementation of a check valve function close to the combustion chamber.

SUMMARY OF THE INVENTION

The present invention introduces substantially anhydrous ionic solutions as monopropellants of very low vapor pressure. The nitrates of ethylamine and n-propylamine, are liquid at room temperature and can serve as an exemplary basis of these solutions, in which further salts, that do not necessarily melt below 20° C., are dissolved to increase the oxygen balance and lower the freezing point. Preferred salts for increasing the oxygen balance and lowering the freezing point include ammonium nitrate (AN), methylammonium nitrate (MAN), ethylenediammonium dinitrate (EDDN), hydrazinium nitrate (HN), guanidinium nitrate (GN), aminoguanidinium nitrate (AGN) and ammonium dinitramide (ADN). Since very short response times of the hot-gas-generating apparatus may be required for pulse mode applications (e.g., position control), it is possible to adapt the low-energy propellant combinations with soluble catalysts in order to shorten the ignition transient. Suitable soluble catalysts include salts and complexes of transition metals, particularly iron compounds, cobalt compounds, copper compounds and silver compounds. In addition, the electrode surfaces can serve as heterogenous catalysts and support ignition and decomposition in the electrode gap. Surface coatings with e.g., copper, silver, platinum, palladium, iridium, rhodium, osmium, ruthenium, rhenium, or a combination thereof are suitable for this purpose, since noble metals are less prone to corrosion by anodic oxidation or cathodic hydrogen embrittlement and able to contribute to an accelerated decomposition by binding and forming reactive species. The conductivity and melting point of the monopropellants can be adjusted by a non-volatile (boiling point: >150° C. at 1 bar), non-ionic additive in concentrations of up to a maximum of 15 mass percent. The low vapor pressure of the non-ionic additive is necessary to avoid evaporative heat losses during ignition. Compound classes such as ureas, guanidines, formamides, imidazoles, triazoles and tetrazoles are particularly suitable for lowering the melting point. Suspended fuels can be added to the monopropellant to increase combustion efficiency, specific impulse and the combustion temperature. Suitable fuels include fine metal powders with comparatively low boiling points and a high heat of combustion, such as powders of aluminum, zinc, boron, magnesium, alloys of the forementioned metals, as well as carbonaceous fuels, such as hexamethylenetetramine. Suspended fuels should have particle sizes smaller than 100 μm, to prevent the injectors from clogging and achieve complete combustion.

Aforementioned ionic propellants are in most cases of negligible toxicity and do not produce any gas phase even if potentially toxic additives (e.g., hydrazine nitrate) are incorporated. The absence of toxic vapors facilitates handling because no hazmat suits, special ventilation systems, or respiratory filters are required, which is a distinctive feature over common storable propellants such as hydrazine, methylhydrazines (MMH, UDMH), dinitrogen tetroxide, nitric acid, hydrogen peroxide, and even the so called "green" ADN propellants (LMP-103S). Furthermore, the properties of the propellant can be adapted to mission specific requirements, since room temperature ionic liquids, are capable of dissolving catalysts and oxygen-rich salts within wide limits.

The ionic character of the described propellants also increases the density and minimizes the sensitivity towards mechanical and thermal stimuli, since negatively charged oxidizers (e.g. nitrate, dinitramide, perchlorate) and positively charged reducing agents (e.g. hydrazinium) are usually more stable than corresponding neutral analogs. Thus, the propellants are able to achieve a density between about 1.2 g/ml and 1.6 g/ml, and an impact sensitivity of at least 30 Nm, frequently even in excess of 50 Nm according to the BAM drop hammer test. The minimum decomposition temperature can be as high as 300° C., which allows for regeneratively cooled applications.

When used as low-energy monopropellants, the ionic solutions achieve a specific impulse at the level of today's hydrazine rocket engines, but without the disadvantage of performance degradation due to aging of the catalyst, since the catalyst is supplied with the fuel and at a constant concentration if required. More energetic variants, that contain dinitramide, nitroformate or perchlorate, exceed the specific impulse of hydrazine and can match the performance of storable bipropellants. In any case, the high density is consequently causing a significant increase in volumetric specific impulse compared to systems currently in use.

The ionic monopropellants under consideration contain sufficient oxygen to sustain an intermolecular combustion reaction even without an external catalyst (in contrast to mostly intramolecular decomposition reactions found in hydrazine or hydrogen peroxide). Since combustion, unlike catalytic decomposition, does not rely on metastable chemical bonds, a propellant with excellent chemical stability can be obtained from the proposed ionic components. At the same time, the relative inertness of the proposed monopropellants also necessitates the elimination of catalytic ignition and requires the introduction of a new ignition method.

The ignition method described in the present invention exploits the good electrical conductivity of the ionic monopropellants to initiate the propellant's electrolytic decomposition with low voltage and a short-duration high electric current. According to present knowledge, the decisive factor is the formation of reactive, oxidizing species at the anode when the anion-specific decomposition voltage (about 5 volts, depending on the composition) is exceeded. For most applications of the hot-gas-generating apparatus, supply with extra-low voltage of typically 10 to about 120 volts is sufficient, such as can be provided from the on-board power supply of an aircraft, a rocket, a satellite, or by electrochemical cells. The low voltage not only minimizes efforts concerning the electrotechnical qualification, but also minimizes the risk of electric discharges in a partial vacuum. In light of this aspect, the invention is superior to systems with spark ignition such as the so-called (augmented) spark igniter as commonly used in hydrogen rocket engines, gas turbines or jet engines. Additionally, the design featuring electrodes surrounded by flowing propellant during operation, also prevents the deposition of combustion residues, which are often problematic in the handling of spark ignition systems.

For operation in an exceptionally short-pulsed mode, voltages up to the upper limit of the low voltage range, i.e. up to about 1000 volts, may be used to shorten the ignition transient. Ignition is possible with both, direct current, and low-frequency alternating current.

Ignition is best initiated at low mass flow rates of the aforementioned ionic monopropellant, as this allows for a reduction of the required electrical ignition power. Depending on the application, temporary throttling of the mass flow rate to well below 50% of the nominal mass flow rate is feasible, with the lowest relative mass flow rates being achieved in high-pressure versions of the hot-gas-generating apparatus. The reason for this is the pressure dependence of the burn rate of droplets originating from the monopropellant. The reaction zone contracts with increasing combustion chamber pressure and the heat flux into the atomization zone is augmented. This also implies, that if ignition is to be achieved under vacuum conditions, a combustion chamber pressure above the so-called Pressure Deflagration Limit (PDL) must be generated based on initial monopropellant decomposition in the electrode gap. Typically, stable, self-sustaining combustion without supply of additional electrical energy is possible from about 1-5 bar chamber pressure. When the critical chamber pressure is reached, the electrical ignition circuit can be discontinued and nominal operation can be commenced. The combustion chamber pressure can already be gradually increased during electrical ignition by increasing the mass flow rate.

Depending on the viscosity and decomposition temperature, heating of the propellant prior to injection, can improve ignition and atomization by the injector. For low viscosity propellants with low thermal stability, preheating to 20-40° C. is usually sufficient. For propellants of high viscosity and high decomposition temperature, preheating to 100-200° C. can help to shorten the ignition transient.

By linking the hot-gas-generating apparatus to an electric pump unit, active valve control may be omitted and a weight reduction over available systems can be realized. As an example, the pump may be a gear pump, which allows precise and rapid adjustment of the mass flow rate. The ionic monopropellant presented in the invention is particularly suitable for pumping because, unlike other present monopropellants, it is compatible with all conventional seal materials and, thanks to its low vapor pressure, shows reduced or no cavitation tendency. The moderate viscosity combined with a high heat capacity and thermal stability also offers the opportunity of using the ionic monopropellant as a coolant and lubricant for the pump unit. Most notably in case of high-power versions of the hot-gas-generating apparatus, the pump can also be driven via the shaft of a gas turbine, which also uses the same low vapor pressure ionic propellant as described.

For safe operation of the hot-gas-generating apparatus, the present invention proposes an injector that can be closed towards the combustion chamber. In principle, the injector thereby functions as a spring-loaded, and/or externally-actuated check valve integrated in the injector head. In particular, the invention comprises a design in which the check valve function is integrated in the section of the highest pressure drop of the injector and at the interface of the injector outlet and the combustion chamber. The automatic closure guarantees a directed propellant supply downstream to the combustion chamber, provided that the inlet pressure of the injector is by some amount greater than the combustion chamber pressure. The amount referred to as crack pressure must be matched to the application and is typically between about 1-10 bar. If the combustion chamber pressure exceeds the inlet pressure of the injector minus the crack pressure, the automatic closure mechanism blocks the propellant supply towards the combustion chamber and interrupts the connection between hot gas and unreacted monopropellant. With the propellant supply cut off, the combustion chamber pressure drops and ignition of the monopropellant in the injector, the supply lines and the tank is physically prevented. This physical separation is particularly important during transient operational phases, such as during shutdown of the hot-gas-generating apparatus, since the injector inlet pressure drops below the nominal combustion chamber pressure in this case. Without a physical separation, the reaction zone would propagate into the injector when the monopropellant reaches a flow velocity that corresponds to the linear burn rate of the propellant at the respective temperatures and pressures.

When the hot-gas-generating apparatus is operated for extended periods without external cooling, there is a risk of overheating of the injector head after the end of operation, since the electrodes can now no longer be cooled by incoming propellant, but the hot combustion chamber still provides a positive heat flux by thermal conduction. The present invention circumvents this problem by using 2 regenerative approaches. First, components of the injector facing the combustion chamber can be connected to a heat sink using heat pipes. Second, the ionic propellant can also be circulated in a secondary circuit with a heat sink after the shutdown of the hot-gas-generating apparatus. Heat sink options for ground-based applications include cooling water circuits and high heat capacity heat conductors. For aeronautical applications, ambient air or bleed air can be used for cooling. Outside of the atmosphere, radiators can radiate heat over a large area or propellant tanks can serve as heat sinks.

Due to the low vapor pressure of the ionic monopropellants, storage in very lightweight, flexible tanks is possible. Owing to the good material compatibility of the ionic propellant, waterproof textiles that had already been developed, such as Dyneema-PET compounds, can be used for this purpose. Even in a vacuum environment, an essentially unpressurized storage can be realized, which allows for drastic weight savings at the structural level.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein.

BRIEF DESCRIPTION OF THE DRAWINGS

Two possible embodiments of the hot-gas-generating apparatus according to the invention are presented below, although the given claims also explicitly provide for the realization of other embodiments. The first embodiment is based on a single conical injector and is shown in FIGS. 1-5. The second embodiment combines two opposing injectors of polygonal geometry and is shown in FIGS. 6-9. The individual figures thereby show:

DETAILED DESCRIPTION OF VARIOUS EMBODIMENTS

In both embodiments of the invention, a substantially anhydrous ionic monopropellant is provided axially through a central propellant supply line 1. The propellant supply line 1 is in communication with the injector housing 4, from which the described monopropellant is injected into the combustion chamber 2. In the embodiment examples, the injector housing 4 and the combustion chamber 2 are connected by a flange which accommodates a temperature-resistant combustion chamber seal 11, made of e.g. flexible graphite. At low loads, the combustion chamber 2 can be made of a nickel-base alloy. At higher loads, the use of ceramic composites, ablative materials such as carbon fiber reinforced phenolic composites, or noble metal alloys such as Ir—Re is advisable. In both embodiments, the gases produced during combustion exit the combustion chamber 2 at supersonic velocity through a de Laval nozzle. The resulting thrust can be used to accelerate aircraft and spacecraft. Apart from being used for thrust generation, the combustion gases can also be used without necessity of a de Laval nozzle in order to drive turbomachinery and piston machines or for ignition purposes.

Figure 1:
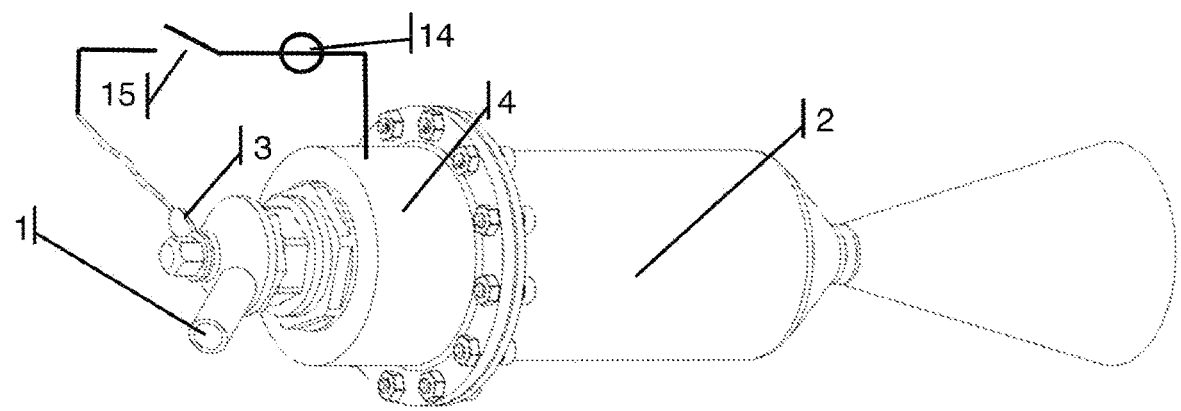
FIG. 1: a perspective view of the hot-gas-generating apparatus with single injector and expansion nozzle with a schematic representation of the power supply.
Figure 2:
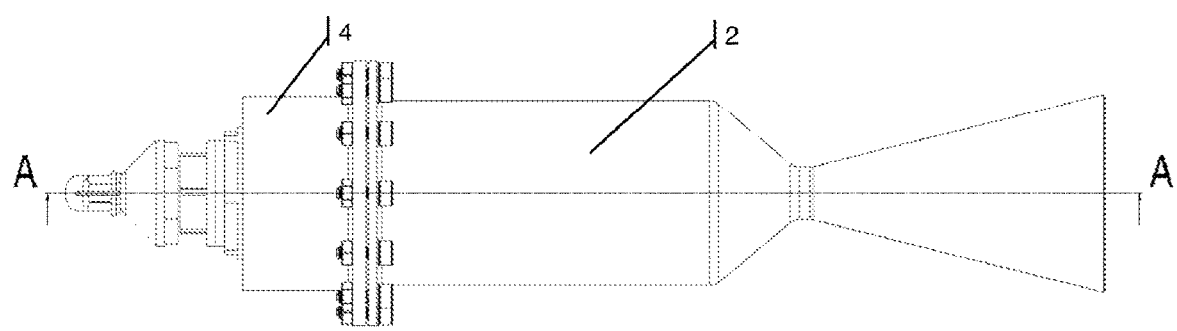
FIG. 2: a top view of the hot-gas-generating apparatus with single injector and expansion nozzle, and illustration of plane A-A of the sectional drawing.
Figure 3:
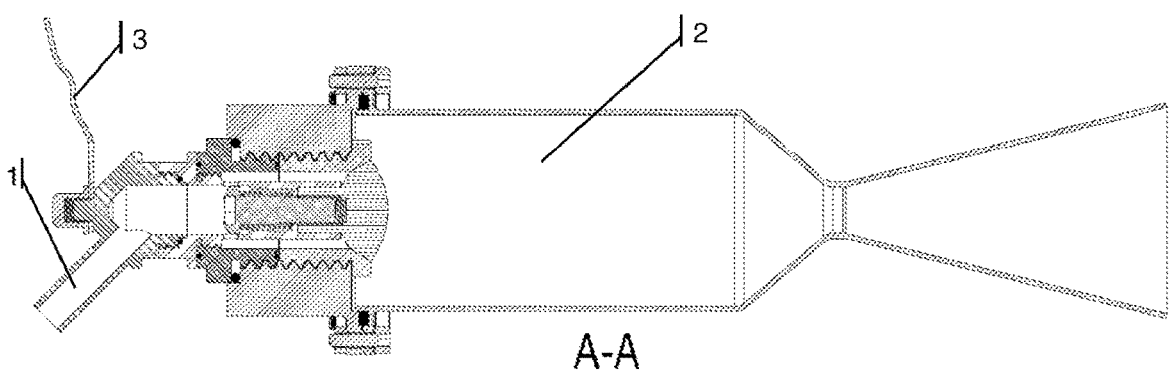
FIG. 3: Sectional drawing representing plane A-A of FIG. 2.
Figure 4:
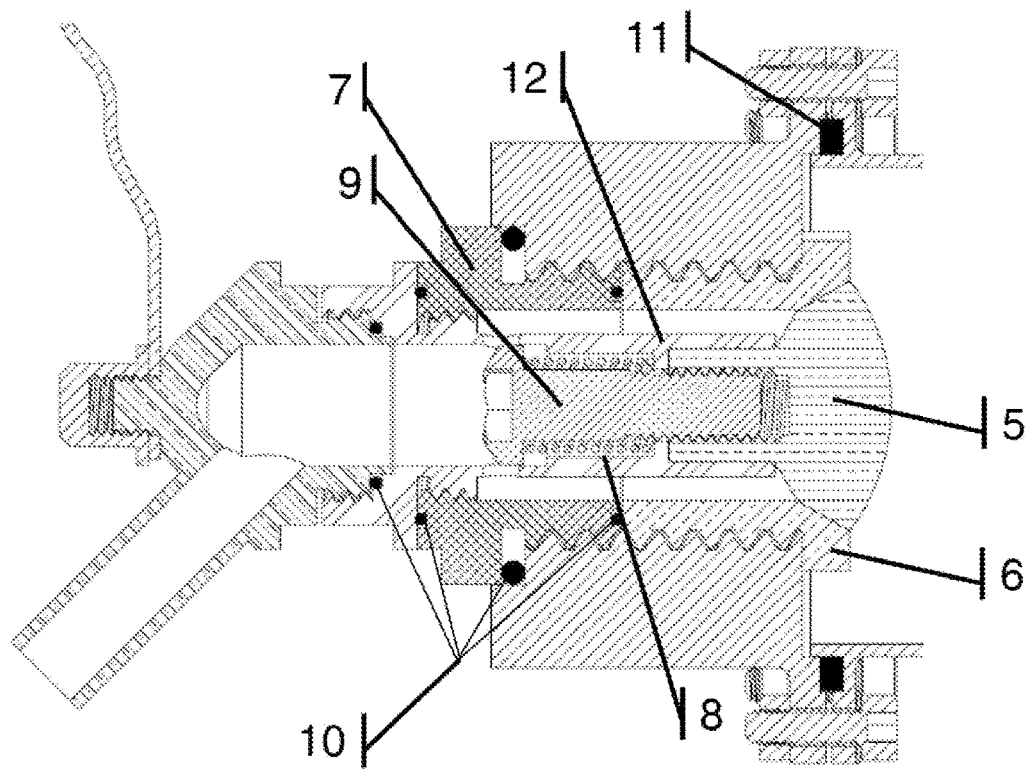
FIG. 4: a detailed view of the injector unit from the sectional drawing shown in FIG. 3 with the injector closed.

Thus, the hot-gas-generating apparatus of FIG. 1 can be used as a hot gas source for a reaction engine, as an igniter of a reaction engine, as an igniter for turbomachinery or as an igniter of a piston machine, or to provide the working gas for turbomachinery or for a piston machine.

In both embodiments, combustion chamber 2 and injector housing 4 are in electrical contact with each other and one pole of a power supply 14. The opposite pole is in electrical continuity with the electrical contact 3, which has a continuing electrical connection to the injector socket 12 (only shown in the embodiment featuring the single injector), the injector screw 9 and the injector electrode 5. Sources of constant polarity current, such as batteries, fuel cells and photovoltaic systems, can be used as power source 14. Likewise, the supply of alternating voltage from e.g. rotating or linear alternators is also possible. The power supply can be disconnected from the electrodes by an electrical switch 15.

Figure 5:
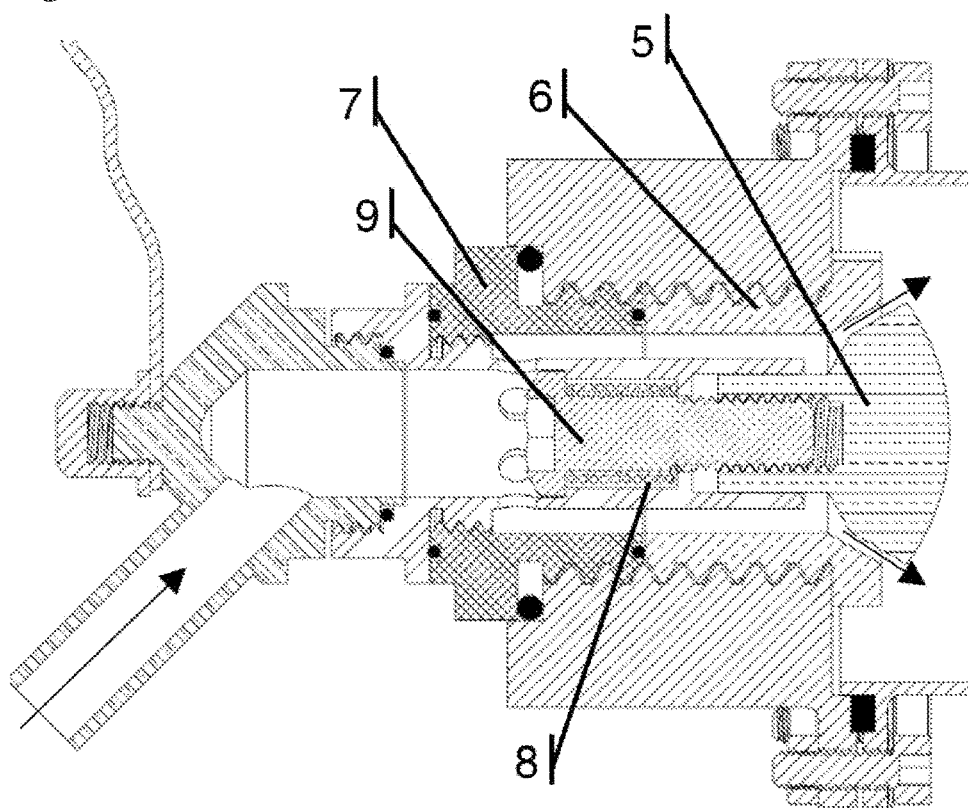
FIG. 5: a detailed view of the injector unit from the sectional drawing shown in FIG. 3 with the injector open, where the arrows indicate the direction of the propellant flow.
Figure 6:
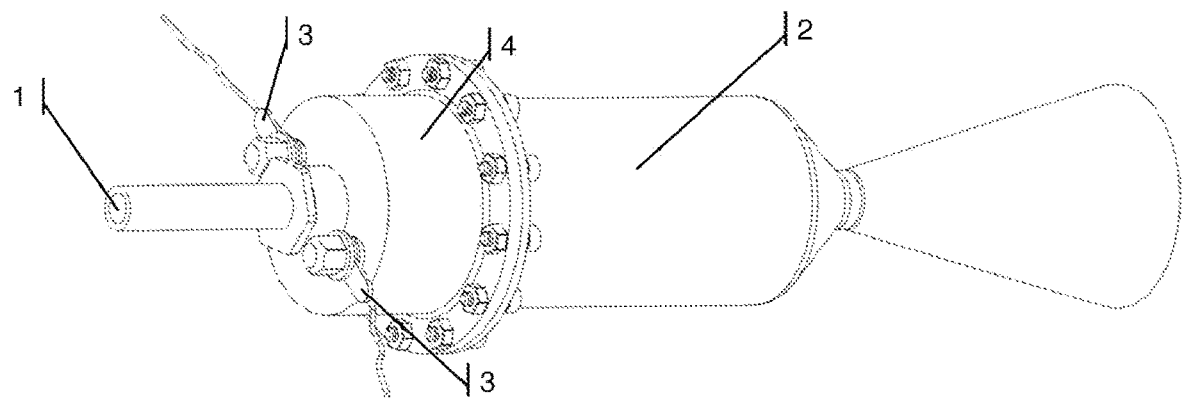
FIG. 6: a perspective view of the hot-gas-generating apparatus with double injector and expansion nozzle.
Figure 7:
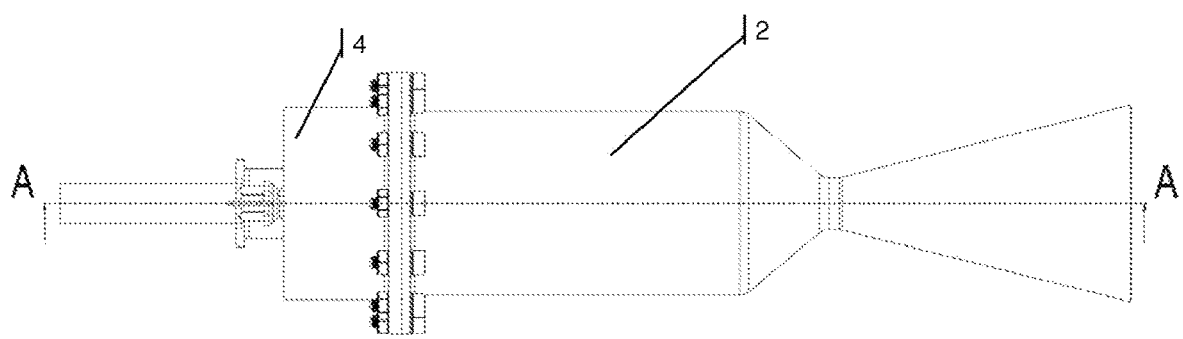
FIG. 7: a top view of the hot-gas-generating apparatus with double injector and expansion nozzle, and illustration of plane A-A of the sectional drawing.
Figure 8:
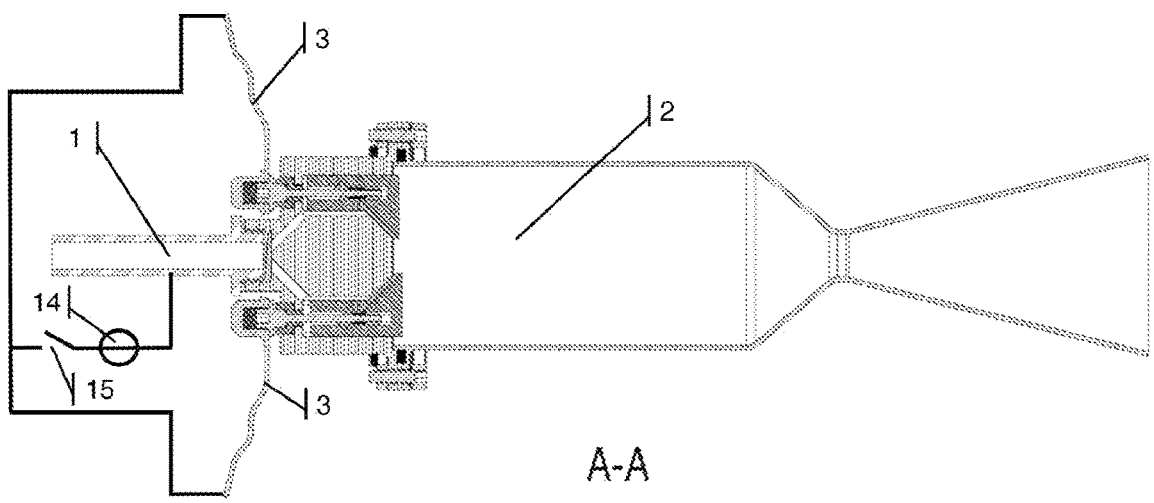
FIG. 8: a sectional drawing representing plane A-A of FIG. 7 and a schematic representation of the power supply.
Figure 9:
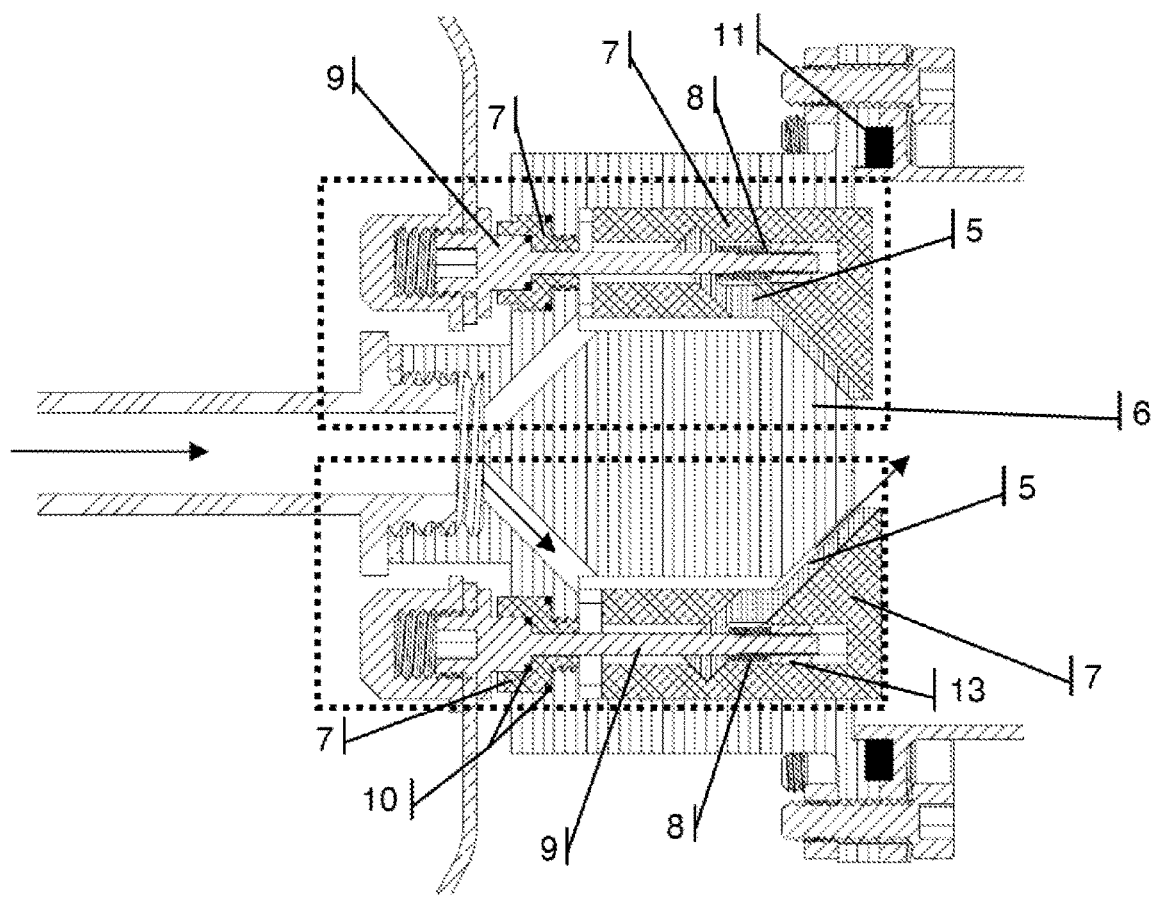
FIG. 9: a detailed view of the injector unit from the sectional drawing shown in FIG. 8 with one closed and one open injector. In this example, the converse opening state only serves to illustrate possible injector states and does not describe any real mode of operation. The arrows indicate the flow direction of the propellant in the open injector.

In the closed state, the injector electrodes 5 are in contact with and sealed against the corresponding counter electrode 6 and thus prevent the backflow of hot gas from the combustion chamber 2 upstream in the direction of the propellant supply 1. In the open state (FIG. 5 and FIG. 9), the presence of propellant in the electrode gap between the counter electrodes 6 and injector electrodes 5 results in the formation of an electrochemical cell.

When current is applied, the propellant in the electrode gap can be heated and ignited. Injector electrodes 5 and counter electrodes 6 can form an electrode gap with an annular (cf. FIGS. 1-5), rectangular (cf. FIGS. 6-9) or polygonal cross section. In addition to single injectors (in FIGS. 1-5 so-called pintle-type injector) and double injectors (in FIGS. 6-9 so-called sheet impingement), other types of impingement injectors or a plurality of injector elements can also be combined in a combustion chamber 2. The selection of materials for injector electrode 5 and counter electrode 6 depends on the respective monopropellant and noble metals such as copper, silver, platinum, palladium, iridium, rhodium, osmium, ruthenium, rhenium, or a combination thereof can be used as a compact base material or coating to improve corrosion resistance and catalytic activity towards the propellant.

In the open state, the injector electrodes 5 are electrically separated from the injector housing 4 upstream of the electrode gap by insulators 7. The insulators 7 can be made of an electrically non-conductive material of moderate temperature resistance, including for example, high-performance polymer classes such as perfluorinated hydrocarbons (PTFE, PCTFE), polyamide-imides (PAI), or polyaryletherketones (PEEK). Polymeric materials might be fiber-reinforced. Another conceivable option are thermally conductive insulators 7 with increased temperature resistance, which can be made of ceramic materials or polymer-coated metallic materials. Reducing the level of thermal requirements concerning the insulators can only be achieved by cooling the injector housing 4. Regarding low load and short duration applications, the injector housing 4 may rely on heat sink cooling and therefore comprise materials of high thermal conductivity such as copper, silver, aluminum, or a combination thereof as illustrated in the embodiments shown herein. In case of high loads, additional radial heat pipes can be integrated into the injector housing 4. Starting from the injector housing 4, the heat can be dissipated either to the surrounding air, a coolant circuit or emitted by radiative transfer to the environment. Owing to the good thermal stability of the propellant, the coolant circuit might also be thermally connected to the propellant reservoir.

As shown in the embodiments for example, the closure of injector electrodes 5 and counter electrodes 6 in the event of insufficient propellant overpressure relative to the combustion chamber 2 is supported by compression springs 8. The stroke of the compression springs 8 can be limited by the injector screw 9 and the injector socket 12 or directly by the injector electrode 5 and an injector nut 13, which is secured against rotation. As an alternative or complementary to the compression springs 8, actuators can be installed, which allow for controlled opening and/or closing of the injectors. In this case, automatic closure in the event of insufficient propellant overpressure can also be ensured by a fast control circuit relying on sensors in the propellant supply and combustion chamber.

The injector housing 4 and all parts in contact with the propellant are sealed against the environment by injector seals 10. O-rings made from thermally stable elastomers (e.g. FKM, FFKM) can be used in low load scenarios, otherwise metallic C-rings might be used at high loads.

Certain embodiments of the propellant include, for example, ionic monopropellants of the following compositions:

Formulation 1:
  80% n-propylammonium nitrate
  18% propargylammonium nitrate
  1% anhydrous copper (II) chloride
  1% graphite powder (<5 μm)

Formulation 2:
  65% ethylammonium nitrate
  24% lithium perchlorate
  6% imidazole
  3% zinc powder (<10 μm)
  2% copper (II) perchlorate

LIST OF REFERENCE SIGNS 1 propellant supply line
2 combustion chamber
3 electrical contact
4 injector housing
5 injector electrode
6 counter electrode
7 insulator
8 compression spring
9 injector screw
10 injector seal
11 combustion chamber seal
12 injector socket
13 injector nut (end stop for compression spring)
14 power supply
15 electrical switch

The invention claimed is:

1. A hot-gas-generating apparatus for reacting a propellant comprising
  a combustion chamber (2);
  at least a first injector arranged in front of the combustion chamber (2), the first injector configured to block flow of propellant towards the combustion chamber (2), and the first injector including electrodes (5, 6);
  at least one supply line (1) for the propellant, whereby the propellant is a monergolic propellant and a substantially anhydrous ionic solution of very low vapor pressure, with a residual water content of less than five percent by mass, and configured to self-sustain combustion at a predetermined combustion chamber pressure;
  the electrodes (5, 6) comprise at least two electrodes of opposite polarity configured to electrically ignite the propellant by passing an electric current through the propellant when the propellant passes between the electrodes of opposite polarity; and
  for blocking the flow of the propellant towards the combustion chamber (2), at least a first automatically sealing injector head (5) situated between the combustion chamber (2) and the first injector, said first automatically sealing injector head (5) allowing the propellant to pass only when an inlet pressure of the first injector is greater than a crack-pressure and represents an overpressure relative to the combustion chamber pressure, and thus a sealing effect is achieved when the combustion chamber pressure exceeds the inlet pressure of the first injector minus the crack-pressure.

2. The hot-gas-generating apparatus according to claim 1, wherein
  the first automatically sealing injector head (5) incorporates at least one of the electrodes of opposite polarity; and
  with the first injector closed, the electrodes (5, 6) of opposite polarity are in electrical contact and in sealing contact.

3. The hot-gas-generating apparatus according to claim 1, wherein
  the propellant is present as an ionic solution as it flows between the electrodes of different polarity;
  the electrical ignition of the flowing ionic solution takes place in a region of an outlet of the first injector; and
  a decomposition temperature of the propellant is locally exceeded.

4. The hot-gas-generating apparatus according to claim 1, further comprising
  an actuator configured for opening and closing the first injector, wherein the first injector is configured to block the flow of the propellant towards the combustion chamber (2) when closed, and
  wherein the first injector is configured to allow the flow of the propellant towards the combustion chamber when open.

5. The hot-gas-generating apparatus according to claim 1, further comprising heat pipes for passive cooling of the propellant, wherein the heat pipes are arranged upstream of the combustion chamber (2).

6. The hot-gas-generating apparatus according to claim 1, wherein the electrodes (5, 6) have a catalytically active surface.

7. The hot-gas-generating apparatus of claim 6, wherein the catalytically active surface is coated with at least one noble metal.

8. The hot-gas-generating apparatus of claim 7, wherein the at least one noble metal comprises at least one metal selected from a list consisting of: copper, silver, platinum, palladium, iridium, rhodium, osmium, ruthenium and rhenium.

9. The hot-gas-generating apparatus according to claim 1, wherein an electric potential between the electrodes of 3 to 1000 volts is applied to ignite the propellant.

10. The hot-gas-generating apparatus of claim 9 wherein the electric potential between the electrodes is between 10 to 120 volts.

11. The hot-gas-generating apparatus according to claim 1, further comprising an electrically operated pump for delivering the propellant from a propellant tank to the first injector.

12. The hot-gas-generating apparatus of claim 11 wherein the propellant tank comprises a textile construction.

13. The hot-gas-generating apparatus according to claim 1, wherein the monergolic propellant comprises at least one soluble catalyst including a salt of a transition metal.

14. The hot-gas-generating apparatus according to claim 1, wherein the monergolic propellant comprises at least one soluble catalyst including a complex of at least one transition metal.

15. The hot-gas-generating apparatus according to claim 1, wherein the monergolic propellant further comprises suspended powdered fuels with average particle sizes of less than 100 μm.

16. The hot-gas-generating apparatus according to claim 1, wherein the monergolic propellant further comprises powdered fuel including at least one material selected from a list consisting of: aluminum, aluminum alloys, magnesium, magnesium alloys, boron and zinc.

17. A method for igniting the monergolic propellant using the hot-gas-generating apparatus of claim 1, the method comprising:
    passing a mass flow of the monergolic propellant between said at least two electrodes of opposite polarity; and
    decomposing the propellant of said mass flow in an electric field of said electrodes of opposite polarity during the ignition.

18. The method according to claim 17, wherein up to 50% of a maximum propellant mass flow of said hot-gas-generating apparatus is passed between said electrodes of opposite polarity.

19. The method of claim 17, further comprising heating the monergolic propellant to at least 20° C. before ignition.

* * * * *